US009709188B2

(12) United States Patent
Williams et al.

(10) Patent No.: US 9,709,188 B2
(45) Date of Patent: Jul. 18, 2017

(54) APPARATUS FOR REGULATION OF THE PRESSURE OF A GAS

(71) Applicants: Mark Sherman Williams, Hamshire (GB); Gareth Ross Pemberton, Worcester (GB); Csaba Alfoldi, Brussels (BE)

(72) Inventors: Mark Sherman Williams, Hamshire (GB); Gareth Ross Pemberton, Worcester (GB); Csaba Alfoldi, Brussels (BE)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/910,188

(22) PCT Filed: Aug. 1, 2014

(86) PCT No.: PCT/EP2014/066653
§ 371 (c)(1),
(2) Date: Feb. 4, 2016

(87) PCT Pub. No.: WO2015/018765
PCT Pub. Date: Feb. 12, 2015

(65) Prior Publication Data
US 2016/0178085 A1 Jun. 23, 2016

(30) Foreign Application Priority Data
Aug. 6, 2013 (EP) .................................... 13179492

(51) Int. Cl.
*F16K 31/12* (2006.01)
*F16K 31/60* (2006.01)
(Continued)

(52) U.S. Cl.
CPC ............ *F16K 31/602* (2013.01); *B23K 9/325* (2013.01); *F17C 1/00* (2013.01); *G05D 16/10* (2013.01);
(Continued)

(58) Field of Classification Search
CPC ..... B23K 9/325; Y10T 137/7807; F17C 1/00; F17C 2205/0329; F17C 2205/0338;
(Continued)

(56) References Cited

U.S. PATENT DOCUMENTS

| 814,285 A | * | 3/1906 | Gold | ........................ | F16K 17/00 |
| | | | | | 123/41.02 |
| 1,887,821 A | * | 11/1932 | Platt | ........................ | G05D 16/18 |
| | | | | | 137/224 |

(Continued)

FOREIGN PATENT DOCUMENTS

| GB | 973914 A | 11/1964 |
| GB | 1018957 A | 2/1966 |

OTHER PUBLICATIONS

European Patent Office, International Search Report of the International Searching Authority, mailed Oct. 9, 2014, for PCT/EP2014/066653.

*Primary Examiner* — Jessica Cahill
(74) *Attorney, Agent, or Firm* — Larry S. Zelson

(57) ABSTRACT

A pressure regulator comprising a housing having an inlet in communication with a gas source, an outlet operable to supply a gas at a given pressure and flow rate, a conduit extending between the inlet and the outlet, a restriction device located in the conduit and positionable to control the flow of gas therethrough, a biasing arrangement to apply a predetermined bias to the restriction device and a selection device operable to select one of a predetermined plurality of discrete, offset configurations of the biasing arrangement and restriction device to provide a discrete selection of gas
(Continued)

pressures at said outlet. The outlet comprises a fixed-size orifice selected from a specific group of fixed-sized orifices such that the combination of orifice and selectable position of said selection device provide a group of discrete flow rate/pressure combinations to applications downstream of said outlet.

14 Claims, 12 Drawing Sheets

(51) Int. Cl.
  *B23K 9/32* (2006.01)
  *G05D 16/10* (2006.01)
  *F17C 1/00* (2006.01)
(52) U.S. Cl.
  CPC .......... *F17C 2205/0329* (2013.01); *F17C 2205/0338* (2013.01); *F17C 2270/0745* (2013.01)
(58) Field of Classification Search
  CPC ............ F17C 2270/0745; F16K 31/60; F16K 31/602; G05D 16/0636; G05D 16/10
  See application file for complete search history.

(56) References Cited

U.S. PATENT DOCUMENTS

| | | | | |
|---|---|---|---|---|
| 2,731,975 | A * | 1/1956 | Boals | G05D 16/10 137/116.5 |
| 3,924,654 | A | 12/1975 | Buller | |
| 5,275,200 | A | 1/1994 | Yamamoto | |
| 5,285,810 | A * | 2/1994 | Gotthelf | B60K 15/03006 137/340 |
| 5,586,569 | A * | 12/1996 | Hanning | G05D 16/0663 137/116.5 |
| 5,657,787 | A * | 8/1997 | Diehl | G05D 16/10 137/116.5 |
| 6,390,134 | B1 | 5/2002 | Hanby | |
| 6,691,735 | B1 * | 2/2004 | Harneit | F16K 37/0008 137/505 |
| 6,834,672 | B2 * | 12/2004 | Chen | B25F 5/00 137/505.42 |
| 7,015,412 | B1 * | 3/2006 | Uttrachi | B23K 35/38 219/74 |
| 8,122,912 | B2 * | 2/2012 | Shemer | G05D 7/0186 138/43 |
| 2008/0047619 | A1 | 2/2008 | Pechtold | |

\* cited by examiner

APPARATUS FOR REGULATION OF THE PRESSURE OF A GAS

The present invention relates a method of, and apparatus for, regulating the pressure of a gas. More particularly, the present invention relates to a method of, and apparatus for, regulating the pressure of a gas to avoid overpressure or surge conditions at a point of use of said gas.

A compressed gas cylinder is a pressure vessel designed to contain gases at high pressures, i.e. at pressures significantly greater than atmospheric pressure. Compressed gas cylinders are used in a wide range of markets, from the low cost general industrial market, through the medical market, to higher cost applications, such as electronics manufacture utilising high purity corrosive, toxic or pyrophoric specialty gases. Commonly, pressurised gas containers comprise steel, aluminium or composites and are capable of storing compressed, liquefied or dissolved gases with a maximum filling pressure up to 450 barg for most gases, and up to 900 barg for gases such as hydrogen and helium.

In order to dispense gases effectively and controllably from a gas cylinder or other pressure vessel, a regulator or valve assembly is required. A valve provides a mechanism by which the flow of gas can be controlled. A regulator is able to regulate the flow of the gas such that the gas is dispensed at a constant, or user variable, pressure.

In order to dispense gases effectively and controllably from a gas cylinder or other pressure vessel, a regulator is required. The regulator is able to regulate the flow of the gas such that the gas is dispensed at a constant, or user variable, pressure.

However, in practice, this is often difficult to achieve. An example application is that of providing shielding for metal inert gas/metal active gas (MIG/MAG) or tungsten inert gas (TIG) welding. Such an application requires flow control so that gas is delivered at the point-of-use at near atmospheric pressure at a prescribed rate, e.g. 15 l/min.

FIG. 1 shows a conventional arrangement for MIG/MAG welding. A gas cylinder 10 stores gas at high pressure, for example, 200 to 300 bar. The gas cylinder 10 has a gas cylinder body 12 comprising a generally cylindrical container having a flat base arranged to enable the gas cylinder 10 to stand unsupported on a flat surface.

The gas cylinder body 12 is formed from steel, aluminium and/or composite materials and is adapted and arranged to withstand the significant internal pressures resulting from the storage of high pressure gas.

A primary regulator 14 is located downstream of the gas cylinder 10, the primary regulator 14 comprising a control valve employing a feedback mechanism such that a constant pressure is maintained at a point downstream of the primary regulator 14. A safety relief valve 16 is arranged downstream of the pressure regulator 14.

The regulator 14 supplies gas at a fixed pressure to MIG/MAG welding equipment 18 connected thereto.

The upstream/downstream pressure ratio may vary from 100:1 when the gas cylinder 10 is full, to as little as 1:1 when the gas pressure within the gas cylinder 10 approaches that of the downstream pressure. As the pressure ratio reduces, commonly, there is a variation in the outlet pressure. In many cases, the pressure may rise, fall or remain constant depending upon the regulator type.

Standard EN ISO22435 prescribes limits for performance in pressure variation. An increase in closure pressure can be typically 10% above nominal set fixed pressure, and allowable up to values 30% greater than nominal set fixed pressure. As the downstream flow rate is a function of pressure, this variation can affect flow performance, dependant on what equipment is connected downstream.

The flow rate is generally controlled by restricting the gas flow, typically through valves or orifices. Gas flow can be precisely metered by controlling the upstream pressure across a fixed orifice size, where the downstream pressure is substantially lower than the upstream pressure.

Consider, for example, welding applications equipment. In such arrangements, the pressure through hoses and pipework in the welding machinery leading to the welding torch is significantly lower than the upstream pressure in a cylinder. Therefore, in such cases, an orifice located close to the pressure source can function as the principle restriction, with the flow rate being determined by the pressure just upstream of the orifice.

However, if the flow is stopped at the end of the hose and pipework, for example, by a solenoid on/off valve linked to weld arc control, then the pressure will rise in the system downstream of the orifice until it equals the pressure upstream. This rise in system pressure between flowing (dynamic) and static conditions can cause undesirable effects.

It is known that downstream equipment can affect the final flow rate at the end of gas flow system. For example, long lengths of hosing, narrow-bore piping, orifices in valves or connectors can all create additional pressure drops within a gas flow system, restricting the flow rate exiting the system. Unfortunately, it is not always possible to predict the final flow rate from the system for different welding equipment and hose lengths, even when given the same upstream pressure and orifice condition.

The above problems combine, in use, to give rise to 'surge' behaviour. A surge is a phenomenon which occurs when a gas changes from static to flowing conditions, for example when a final closure valve is opened.

Upon opening a valve, there is a transition time between first starting gas flow and achieving a steady state condition. During this time, the pressure in the applications equipment reduces from the static pressure in storage (which is equal to the upstream pressure) to a much reduced level close to atmospheric pressure. Due to this pressure gradient, the flow rate will be higher, leading to higher gas use than may be necessary for a brief, but significant, amount of time.

A further complication is that variation in equipment design set-up can significantly affect the surge phenomenon. Yet further, the operational duty cycle (i.e. the time for which the gas is flowing relative to time for which the gas feed is closed) can also affect the surge volume. Rapid on/off cycling, for example as necessary in tack welding application can require the proportion of off time to be similar to the proportion of "on" time, leading to significant surge issues.

FIG. 2 is a graph illustrating this phenomenon. It can be seen from this figure that the flow rate never settles to a steady-state, constant flow condition (such as when a valve is always open) before the flow is stopped in the duty cycle. Such intermittent flows are hard to set up accurately with conventional welding ball-in-tube flow checkers, because of this rapid cycling.

A number of existing arrangements attempt to address the above problems. For example: weld surge protectors; two stage regulators (which are designed specifically to reduce the variation from the primary highest pressure source); and the provision of additional orifices in welding applications equipment are known in the art.

However, each of the existing solutions has drawbacks. Firstly, they comprise additional equipment to add to the welding system, which increases the size, complexity and cost of such equipment.

Further, the above solutions are only relevant or effective if the particular combination of equipment set-up and cycle duty warrants such an arrangement. It is not necessary to have such equipment for every welding application, leading to the need to modify apparatus for different purposes.

Furthermore, adjusters have to be set up and tuned individually to each equipment set-up. This is difficult to achieve reliably if the cycle on-off time is rapid. Specialist knowledge and good training, together with effective manufacturing control systems are needed to get the best out of such solutions, making them inflexible and inefficient.

EP-A-0916891 and U.S. Pat. No. 6,314,986 describe a gas control device, comprising a group of components, integrated in a manner to provide the necessary control, closure and safety functions. However, even components such as disclosed in these applications, surge cannot be controlled in every end user application.

Therefore, there exists in the art a need for an improved pressure regulator which is operable to reduce the risk of surge when used with variable flow rate systems, or systems with rapid on/off cycling.

According to an aspect of the present invention, there is provided a pressure regulator for regulating the flow rate of a gas source, the pressure regulator comprising a housing having an inlet in communication with the gas source, an outlet operable to supply a gas at a given pressure and flow rate, a conduit extending between the inlet and the outlet, a restriction device located in the conduit and positionable to control the flow of gas therethrough, a biasing arrangement to apply a predetermined bias to the restriction device and a selection device operable to select one of a predetermined plurality of discrete configurations of the biasing arrangement and restriction device to provide a discrete selection of gas pressures at said outlet, and wherein the outlet comprises a fixed-size orifice selected from a specific group of fixed-sized orifices such that the combination of orifice and selectable position of said selection device provide a group of discrete flow rate/pressure combinations to applications downstream of said outlet.

By providing such an arrangement, the combination of a predefined set of discrete selectable gas pressures and a section of fixed orifice sizes provides for a selection of particular flow rate/pressure combinations which reduce the likelihood of surge, depending upon the application.

In other words, the present invention enables flow control at a set flow rate by combining a preset selectable pressure regulator module with interchangeable fixed-size orifice modules, the sizing determined such that the complete range of modules provide metered flow and optimized surge for a range of downstream equipment.

In contrast, known arrangements are complicated to optimise weld conditions. For example, known arrangements require the user to adjust a regulator, flow control valve or economizer, and then confirm the metered flow with a flow-tube. Such iterative optimisation is wasteful of time, resources and equipment.

According to a first aspect of the present invention, there is provided a pressure regulator for regulating the flow rate of a gas source, the pressure regulator comprising a housing having an inlet in communication with the gas source, an outlet operable to supply a gas at a given pressure and flow rate, a conduit extending between the inlet and the outlet, a restriction device located in the conduit and positionable to control the flow of gas therethrough, a biasing arrangement to apply a predetermined bias to the restriction device and a selection device operable to select one of a predetermined plurality of discrete configurations of the biasing arrangement and restriction device to provide a discrete selection of pressure settings for gas pressure at the outlet, wherein the outlet comprises a fixed-size orifice selected from a specific group of interchangeable fixed-sized orifices such that the combination of orifice and discrete pressure setting provides a group of discrete flow rate/pressure combinations to variable flow rate applications downstream of said outlet, and wherein, for a particular discrete flow rate, the combination of fixed-size orifice and discrete pressure setting is selected in dependence upon the duty cycle of the variable flow rate application.

In one embodiment, a particular discrete flow rate can be obtained from two combinations of fixed-size orifice and discrete pressure setting.

In one embodiment, the number of selectable discrete, offset positions is five or fewer.

In one embodiment, the number of selectable discrete, offset positions is three or fewer.

In one embodiment, the selection device comprises a rotary control member operable to select one of said discrete configurations, said rotary control member being operable to latch in each of said discrete configurations.

In one embodiment, said rotary control member is operable to move a control device to one of a predetermined number of linearly-offset positions, the bias from said biasing arrangement being dependent upon said linear position.

In one embodiment, the biasing arrangement comprises at least one control compression spring and the bias of the control compression spring is dependent upon the linear offset of said control device.

In one embodiment, said control device comprises at least one pin operable to slide within a corresponding channel, said pin and channel controlling the linear movement of said control device.

In one embodiment, the or each channel comprises a plurality of locating notches for receiving the or each corresponding pin, each locating notch defining a discrete configuration of said selection device.

In one embodiment, the selection device comprises a resilient element to bias the or each pin into a respective locating notch.

In one embodiment, the selection device further comprises a graspable rotatable handle.

In one embodiment, said graspable rotatable handle is rotatable through an angular range of less than 180° to select any of said discrete positions.

In one embodiment, the restriction device comprises a linearly-movable valve connected to a diaphragm or a piston.

In one embodiment, said fixed size orifices are interchangeable.

According to a second aspect of the present invention, there is provided a valve assembly including the pressure regulator of the first aspect.

According to a third aspect of the present invention, there is provided a gas cylinder assembly including a gas cylinder body and the valve assembly of the second aspect.

Embodiments of the present invention will now be described in detail with reference to the accompanying drawings, in which.

Figure 1:
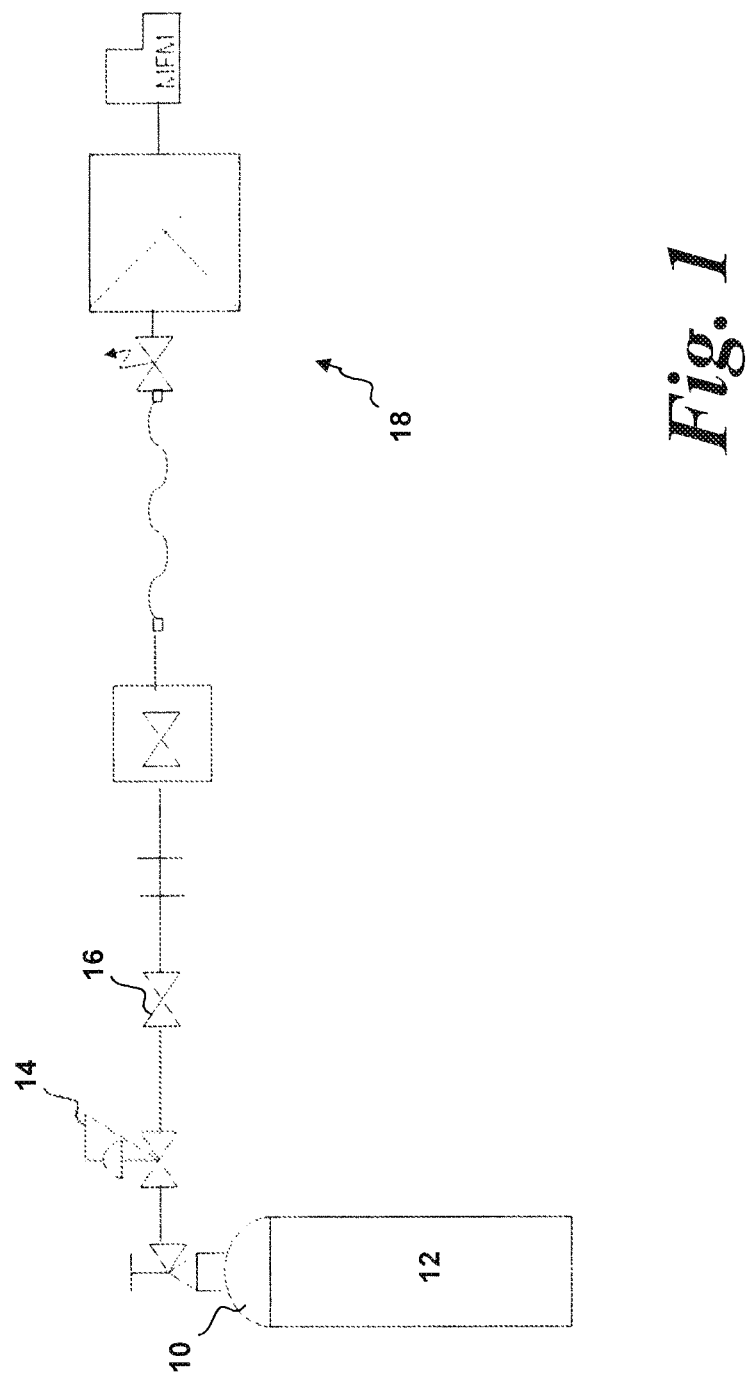
FIG. 1 is a schematic diagram of a gas cylinder and regulator assembly.
Figure 2:
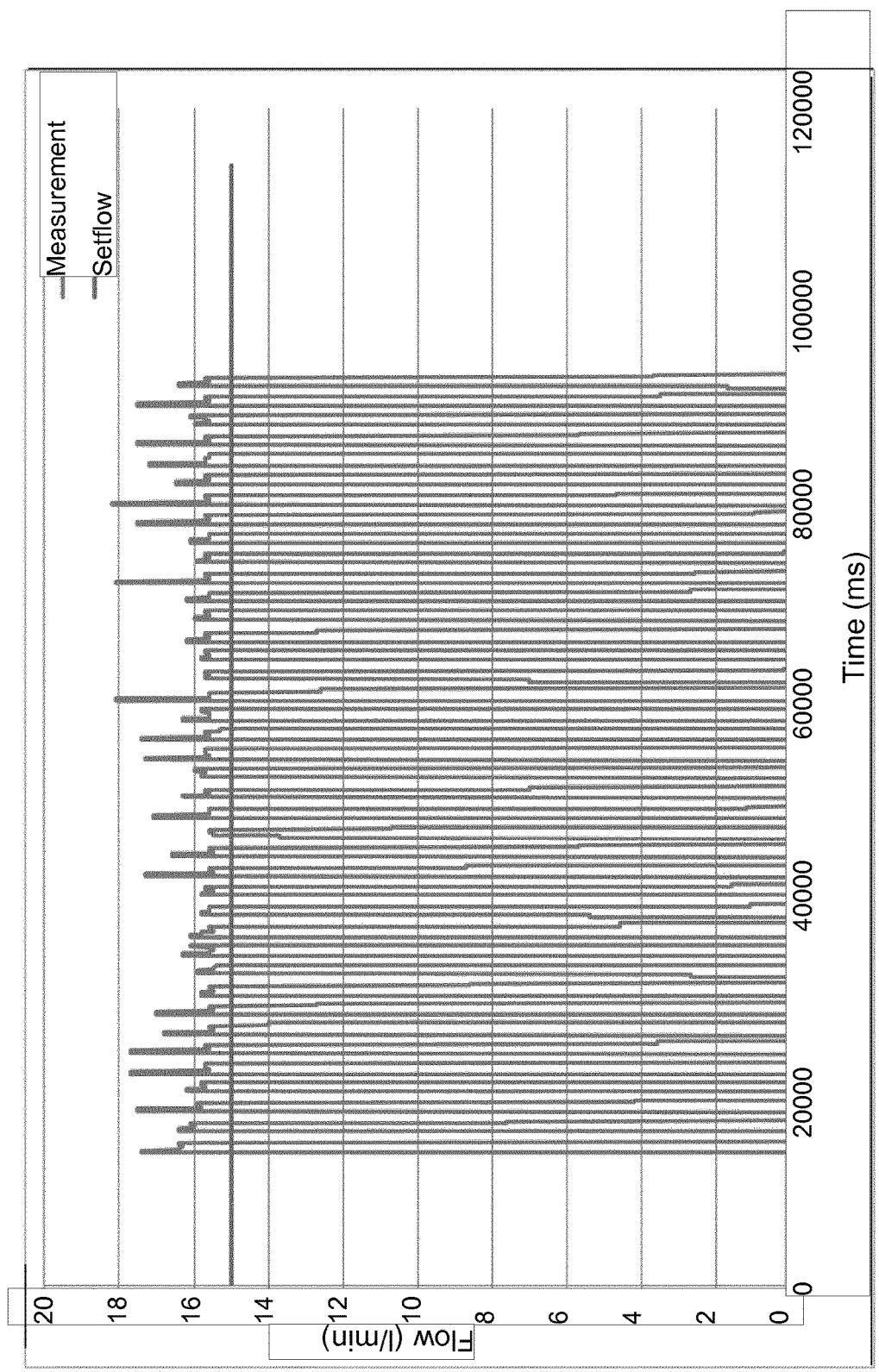
FIG. 2 is a graph showing flow rate as a function of time for a rapid cycling welding application.
Figure 3:
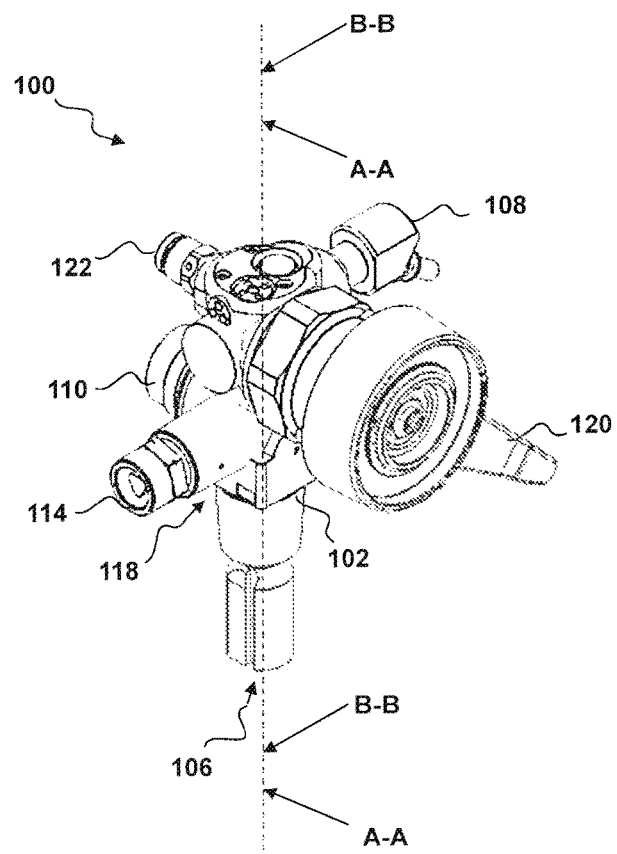
FIG. 3 is an isometric view of a valve and pressure regulator assembly according to an embodiment.
Figure 4:
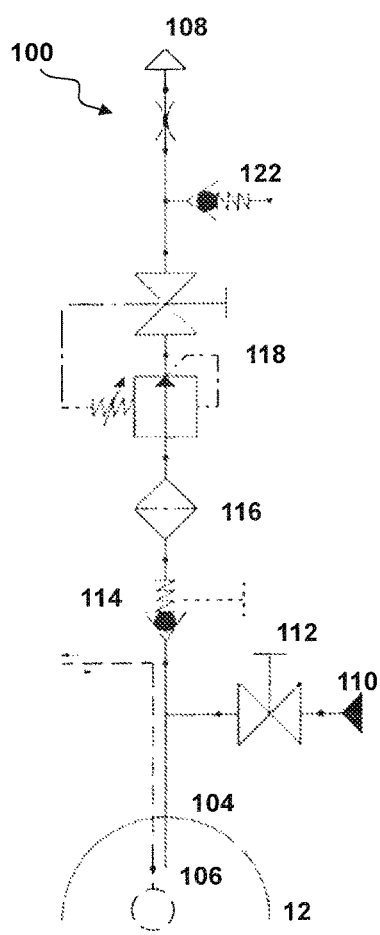
FIG. 4 is a schematic diagram of the components of the valve and pressure regulator of FIG. 3.

FIG. 3 shows an isometric view of the valve and pressure regulator assembly 100 according to an embodiment of the present invention. FIG. 3 shows an isometric view of the valve assembly 100. FIG. 4 shows a general schematic component overview of a valve assembly 100 according to an embodiment of the present invention. The valve assembly 100 is suitable for connection to a gas cylinder 12 as shown in later figures.

The valve assembly 100 may, for example, comprise a VIPR (Valve with Integrated Pressure Regulator). The valve 100 comprises a valve body 102. A conduit 104 is formed in the valve body 102 and extends through the interior of the valve body 102 between an inlet 106 and an outlet 108 to enable gas to flow in a controlled manner from the gas cylinder 12 to end user applications downstream of the outlet 108.

The valve body 102 comprises a screw thread adjacent the inlet 106 for engagement with a complementary aperture at a neck of the gas cylinder 12. The outlet 108 is adapted and arranged to enable the gas cylinder 12 to be connected to other components in a gas assembly; for example, hoses, pipes, or further pressure valves or regulators.

A fill port 110 including a valve 112 is located in a branch pipe extending from the conduit 104. The fill port 110 enables the gas cylinder 12 to be filled with gas in use. A residual pressure shut-off valve 114 is located in the conduit 104 downstream of the gas cylinder 12.

A filter 116 is located downstream of the shut-off valve 114. Downstream of the filter 116 is located a pressure regulator 118. The pressure regulator 118 is operable to provide a fixed, regulated pressure output to the outlet 108 as will be described later. The pressure is selectable by a rotatable, graspable handle 120 (as shown in FIG. 3) and can be set to discrete pressure values. The components of the pressure regulator 118 will be described in more detail later with reference to FIGS. 5 to 8.

The valve assembly 100 further comprises a safety relief valve 122 located downstream of the pressure regulator 118 and upstream of the outlet 108. The outlet 108 comprises a flow restriction orifice selected from a group of orifices as will be described later.

Figure 5:
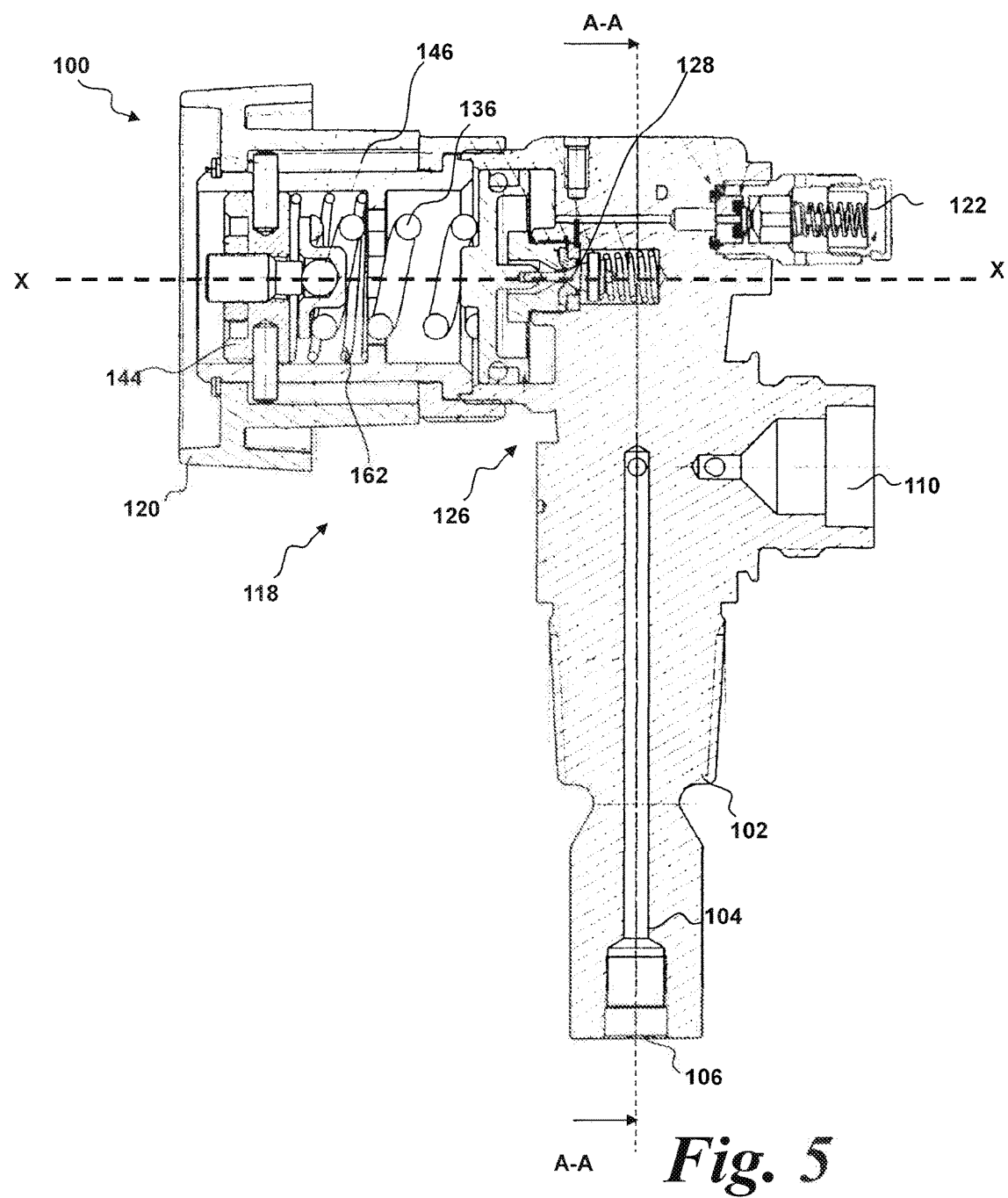
FIG. 5 is a cross-sectional view taken through the valve of FIG. 3 in the direction A-A shown in FIG. 3.
Figure 6:
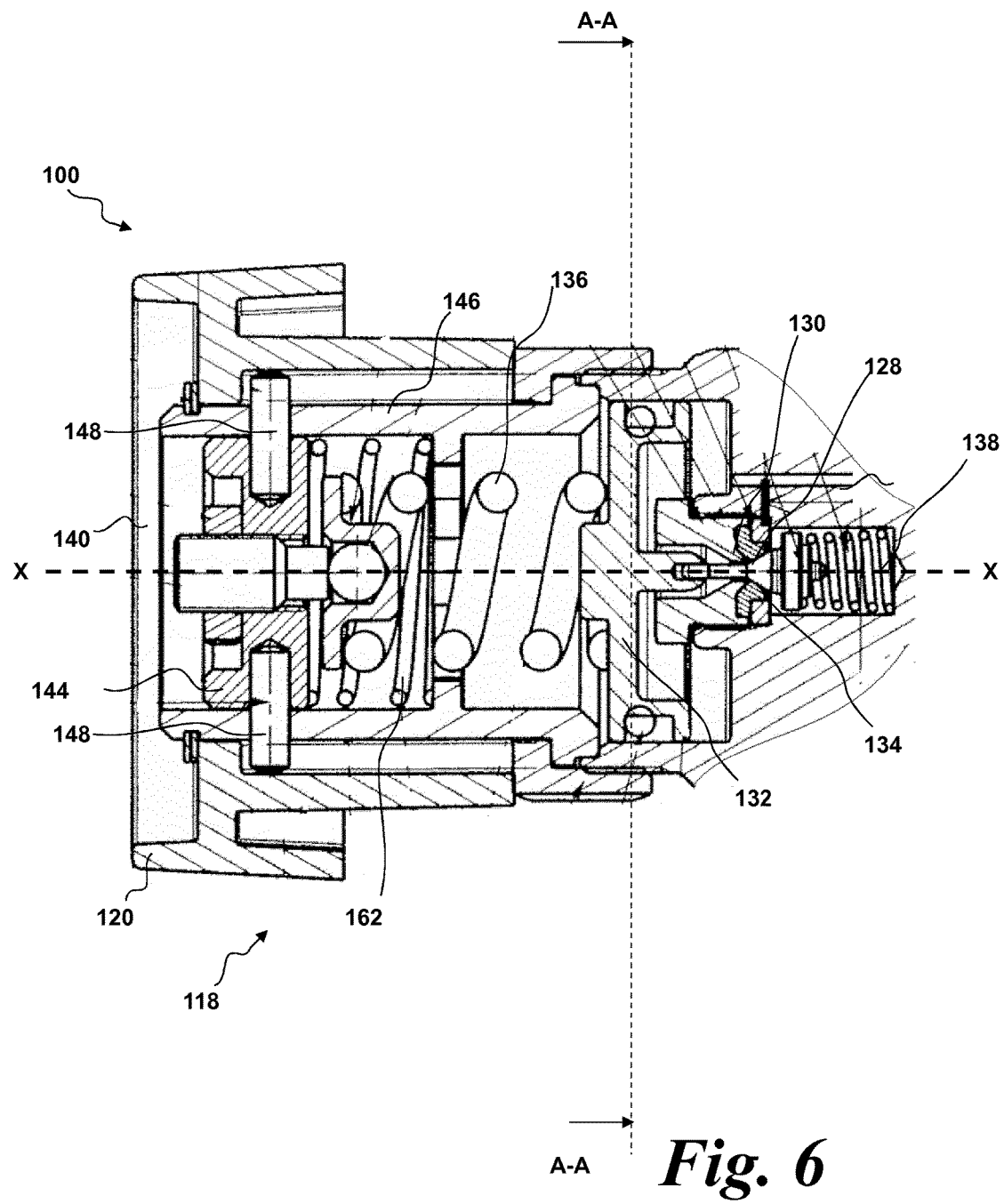
FIG. 6 is a magnified view of the pressure regulator of FIG. 5.
Figure 7:
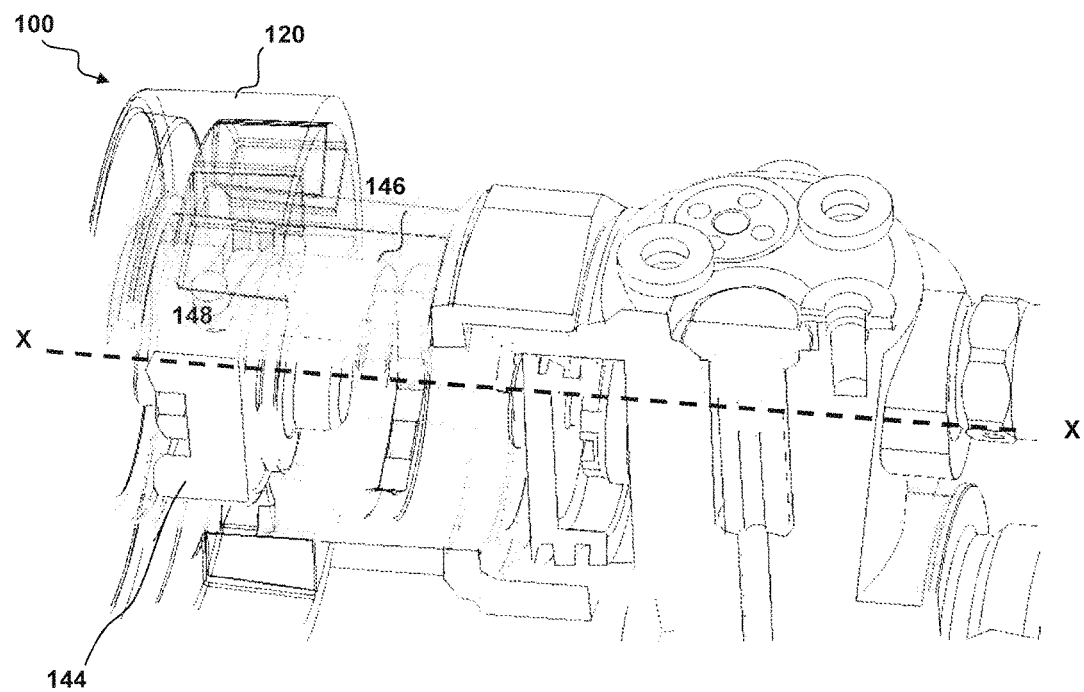
FIG. 7 is an isometric cut-away view of the valve assembly of FIG. 3.

FIGS. 5, 6 and 7 show the valve assembly 100 in more detail. FIG. 5 shows a cross section through the valve assembly 100 taken in the direction A-A of FIG. 3. FIG. 6 shows a more detailed view of FIG. 5. The pressure regulator 118 will now be described in more detail with reference to FIGS. 5 and 6. Detailed components are only labelled in FIG. 6.

In this embodiment, the pressure regulator 118 comprises a single piston regulator. However, the skilled person would be readily aware of variations that could be used with the present invention; for example, a diaphragm regulator (as will be described in a later embodiment) or other arrangement.

The regulator 118 comprises a valve region 126 in communication with the inlet 106 and outlet 108. The valve region 126 comprises a poppet valve 128 located adjacent a valve seat 130. The poppet valve 128 is connected to a piston 132 which is configured to enable translational movement of the poppet valve 128 along the axis X-X towards and away from the valve seat 130 to close and open respectively an aperture 134 therebetween.

The piston 132 is resiliently biased by a biasing arrangement in the form of a control spring 136 located about the axis X-X. However, other biasing arrangements may be used as appropriate, for example other resilient means or pressure-based devices. The skilled person would be readily aware of variations which would fall within the scope of the present invention.

A further opposing spring 138 is provided to act directly on the poppet valve 128 to provide a stabilising and centring force on the poppet valve 128.

The regulator 118 is operable to receive gas from the gas cylinder 12 at full cylinder pressure (e.g. 100-900 bar), but to deliver gas at a substantially constant fixed low pressure (e.g. 5 bar) to the outlet 108. This is achieved by a feedback mechanism whereby the pressure of gas downstream of the aperture 134 is operable to act on the piston 132 in opposition to the biasing force of the spring 136. This counterbalancing effect provides for a particular pressure at which the system is in equilibrium. Thus, at the desired particular set pressure, the spring and gas forces are selected to be equal.

Therefore, should the pressure of gas in the region adjacent the piston 132 exceed the specified level, the piston 132 is operable to move along the axis X-X (towards the left hand side of FIGS. 5 and 6). As a result, the poppet valve 128 is moved closer to the valve seat 130, reducing the size of the aperture 134 and, consequently, restricting flow of gas from the inlet 106 to the outlet 108. Concomitantly, if the gas pressure reduces, the poppet valve 128 is arranged to move away from the valve seat 130 and the size of the aperture 134 is increased.

The mechanism by which the pressure can be set will now be described. The pressure of the gas can be set at predetermined, discrete pressures. In other words, the regulator 118 is not operable to enable the gas pressure cannot be continuously varied and, instead, only a discrete selection of pre-determined pressure values spaced by a pre-determined intervals can be selected by a user.

The graspable handle 120 (shown in FIGS. 3, 5 and 6) enables a user to specify the pressure setting of the pressure regulator 118. The graspable handle 120 comprises a central boss 140 and a graspable arm 142 attached thereto. The central boss 140 is rotatable about the axis X-X and is connected to the valve body 102 by means of a screw or other releasable connection.

As shown in FIGS. 5 to 7, the pressure regulator 118 comprises a central barrel 144 surrounded by a cylindrical guide 146. The central barrel 144 is arranged to rotate within the cylindrical guide 146 and to translate back and forth along the axis X-X relative thereto.

With reference to FIGS. 5 to 7, the central barrel 144 comprises a pair of equi-spaced pins 148. The pins 148 are located at opposing sides of the central barrel 144 and extend outwardly therefrom.

Figure 8:
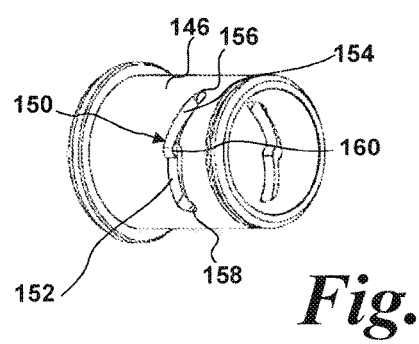
FIG. 8 is an isometric view of a cylindrical guide of the valve assembly of FIGS. 3 and 7.
Figure 9:
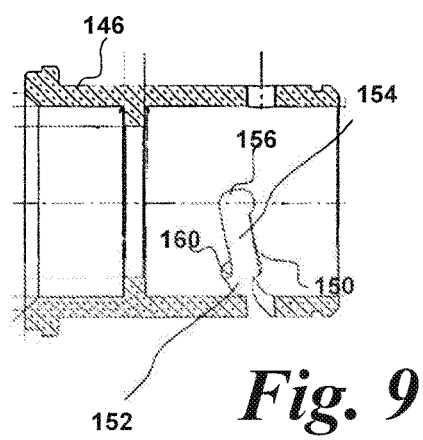
FIG. 9 is a cross section taken through the cylindrical guide of FIG. 8.

As shown most clearly in FIGS. 7 to 9, the cylindrical guide 146 comprises a pair of channels 150. Each of the pins 148 is received in a respective channel 150 and extends therethrough. Each channel 150 extends around the circumference of the cylindrical guide 146 at an acute angle to the axis X-X. In other words, each channel 150 has a length component which extends along the axis X-X. Therefore, rotational movement of the central barrel 144 relative to the cylindrical guide 146 will cause, by virtue of the pins 148 moving in the respective channels 150, the central barrel 144 to translate back and forth along the axis X-X towards and away from the piston 132.

The distal ends of the pins 148 are connected to the central boss 140 of the graspable handle 120 through use of a circlip or other connecting means. Thus, in use, the graspable arm 142 can be rotationally manipulated by a user to move the pins 148 within the channels 150 and so translate the central barrel 144 back and forth along the axis X-X.

As shown in FIGS. 8 and 9, each of the channels 150 comprises first and second sections 152, 154. The first and second sections 152, 154 are, in this embodiment, substantially linear but this need not be the case. Different shapes, paths or angles of the channels 150 or of the first and second sections 152, 154 may be used to, for example, provide different linear movement speeds or accelerations of the central barrel 144. The skilled person would readily be aware of variations that would fall within the scope of the present invention.

Each channel 150 further comprises first, second and third locating notches 156, 158, 160. The first and third locating notches 156, 158 are located at either end of each channel 150. The second locating notch is located between the first and second sections 152, 156. Each locating notch 156, 158, 160 is shaped and dimensioned to receive the respective pin 148 is a substantially rotationally stable position as will be described.

As shown in FIGS. 5 and 6, spring 162 is provided between the central barrel 144 and an end surface of the cylindrical guide 146. The further spring 162 is provided in a nested configuration with the compression spring 136. In other words, the spring 162 surrounds a part of the compression spring 136 and is substantially parallel thereto.

The spring 162 is operable to bias the central barrel 144 away from the piston 132 in the direction of the axis X-X. Thus, to move the pins 148 and central barrel 144 from the first locating notch 156 to the second locating notch 158 along the first channel 152, a force must be in opposition to the bias of the spring 162. The same applies when moving from the second locating notch 158 to the third locating notch 160 along the second channel 154.

Further, the longitudinally applied bias from the spring 162 causes the pins 148 to be held in a respective notch 156, 158, 160, providing a substantially rotationally stable system with three discrete operational positions.

Due to the shape of the notches and the bias from the spring 162, a greater torque is required to move the pins 148 from the locating notches 156, 158, 160 than to move the pins 148 along either of the first or second sections 152, 154.

Therefore, as shown and described, each of the channels 150 thus defines three stable positions for the pins 148 moving in the channels 150. Each of the three stable positions defines three discrete pressure settings for the pressure regulator 118. In summary, the selector comprises a spring mechanism which is operable to latch and hold the pressure regulator 118 in one of a set of discrete preset positions As described above, the compression spring 136 is operable to act on the piston 132 in opposition to the gas pressure acting on the piston 132. As shown in FIGS. 5 and 6, the compression spring extends along the axis X-X between the piston 132 and an end wall of the central barrel 144.

Therefore, movement of the central barrel 144 towards the piston 132 will increase the compression of the compression spring 136. This will, therefore, apply a greater force to the piston 132 and so a higher gas pressure will be required to close the aperture 134, thereby setting gas regulation at a higher pressure.

In other words, the present invention provides an arrangement operable to enable selection of the compression length of the control compression spring 136 in a plurality of preset positions.

Thus, in summary, rotation of the graspable handle 120 enables a user to adjust the biasing force of the compression spring 136 between one of three selectable positions. In this embodiment, the first locating notch 156 defines an "off" position in which the aperture 134 is closed by the poppet valve 128 and where there is no gas flow. The second and third locating notches 158, 160 define two different and discrete operating pressures, with the third locating notch 160 defining the highest gas pressure setting.

Only these three settings are selectable on the pressure regulator 118. If a position different from one of the settings defined by the locating notches 156, 158, 160 is selected, then the bias of the spring 162 will cause the mechanism to move to the next notch in line, i.e. if a position is selected between the second and third notches 158, 160, then the combined bias of the spring 162, gas pressure and compression spring 134 will push the pins 148 back along the second portion of the channels 150 to the second locating notch 158. The same applies for an attempt to set the pressure at a point between the second and first notches 156, 158.

Alternative arrangements can be provided and fall within the scope of the present invention. For example, different numbers of locating notches may be provided to increase the number of discrete offset settings available.

Figure 10:
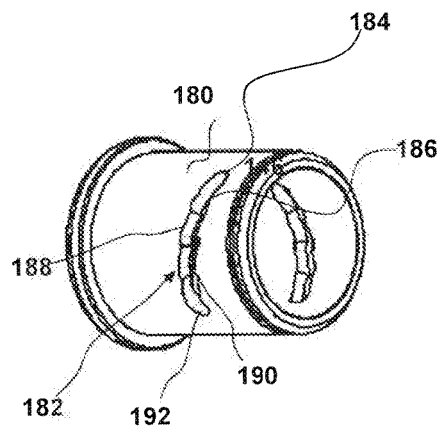
FIG. 10 is an isometric view of an alternative cylindrical guide suitable for use with the valve assembly of FIGS. 3 and 7.
Figure 11:
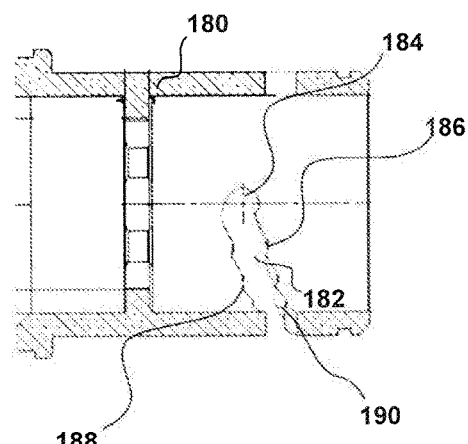
FIG. 11 is a cross section taken through the cylindrical guide of FIG. 10.

FIGS. 10 and 11 show an alternative embodiment of cylindrical guide 180 comprising channels 182. Each channel 182 comprises five locating notches 184, 186, 188, 190, 192. The locating notches 184, 186, 188, 190, 192 are substantially similar to those described previously. However, the use of the cylindrical guide 180 enables five discrete settings to be selected on the pressure regulator 118.

In the alternative, any number of locating notches may be provided as required to provide the necessary number of pre-determined pressure settings.

As will be described later, the unique use of pre-set, discrete pressure settings provides for the possibility of surge mitigation in a manner which is easy and quick for a user to set up, without the need for laborious and complex iterative measurements of the system and component pressures.

Figure 12:
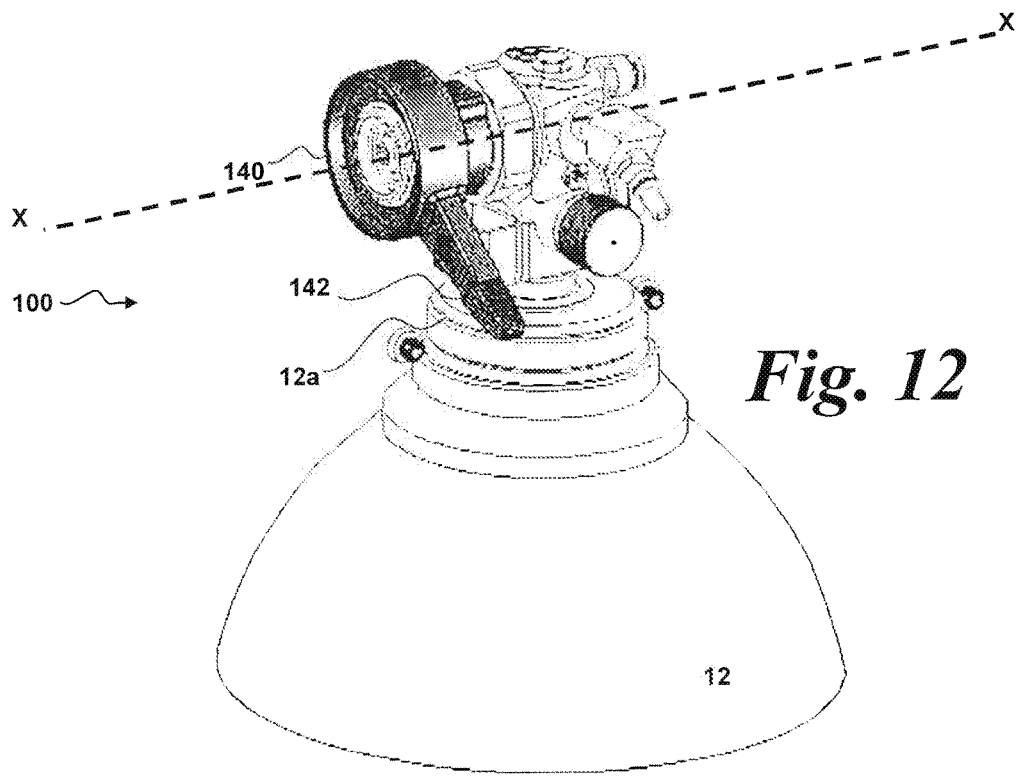
FIG. 12 is an isometric view of the valve assembly of FIG. 3 connected to a gas cylinder.

FIG. 12 shows the valve arrangement 100 connected to a gas cylinder 12. The gas cylinder 12 comprises a generally cylindrical pressure vessel having a flat base (not shown) arranged to enable the gas cylinder 12 to stand unsupported on a flat surface.

The gas cylinder 12 has a body is formed from steel, aluminium and/or composites material and is adapted and arranged to withstand internal pressures up to approximately 900 barg. A neck 12a is located at a proximal end of the gas cylinder 12 opposite to the base and defines an aperture providing access to the interior of the gas cylinder. The neck 12a comprises a screw thread (not shown) adapted to receive the valve arrangement 100.

As described, the valve arrangement communicates with the interior of the gas cylinder 12 through the inlet 106 and conduit 104. The conduit 104 extends into the centre section of the gas cylinder 12. The valve body 102 has a complimentary threaded portion which connects to the neck 12a of the gas cylinder 12.

The gas cylinder 100 defines a pressure vessel having an internal volume. Any suitable fluid may be contained within the gas cylinder 100. However, the present embodiment relates, but is not exclusively limited to, purified permanent gases which are free from impurities such as dust and/or moisture. Non-exhaustive examples of such gases may be: Oxygen, Nitrogen, Argon, Helium, Hydrogen, Methane, Nitrogen Trifluoride, Carbon Monoxide, Krypton or Neon.

The user is able to select the desired output pressure (which in this embodiment, comprises one closed setting and two different pressure settings) by means of rotation of the graspable handle 120. The graspable handle 120 comprises a graspable arm 142 which is rotatable by a user between the three selectable positions. This is shown in FIGS. 13 and 14.

Figure 13:
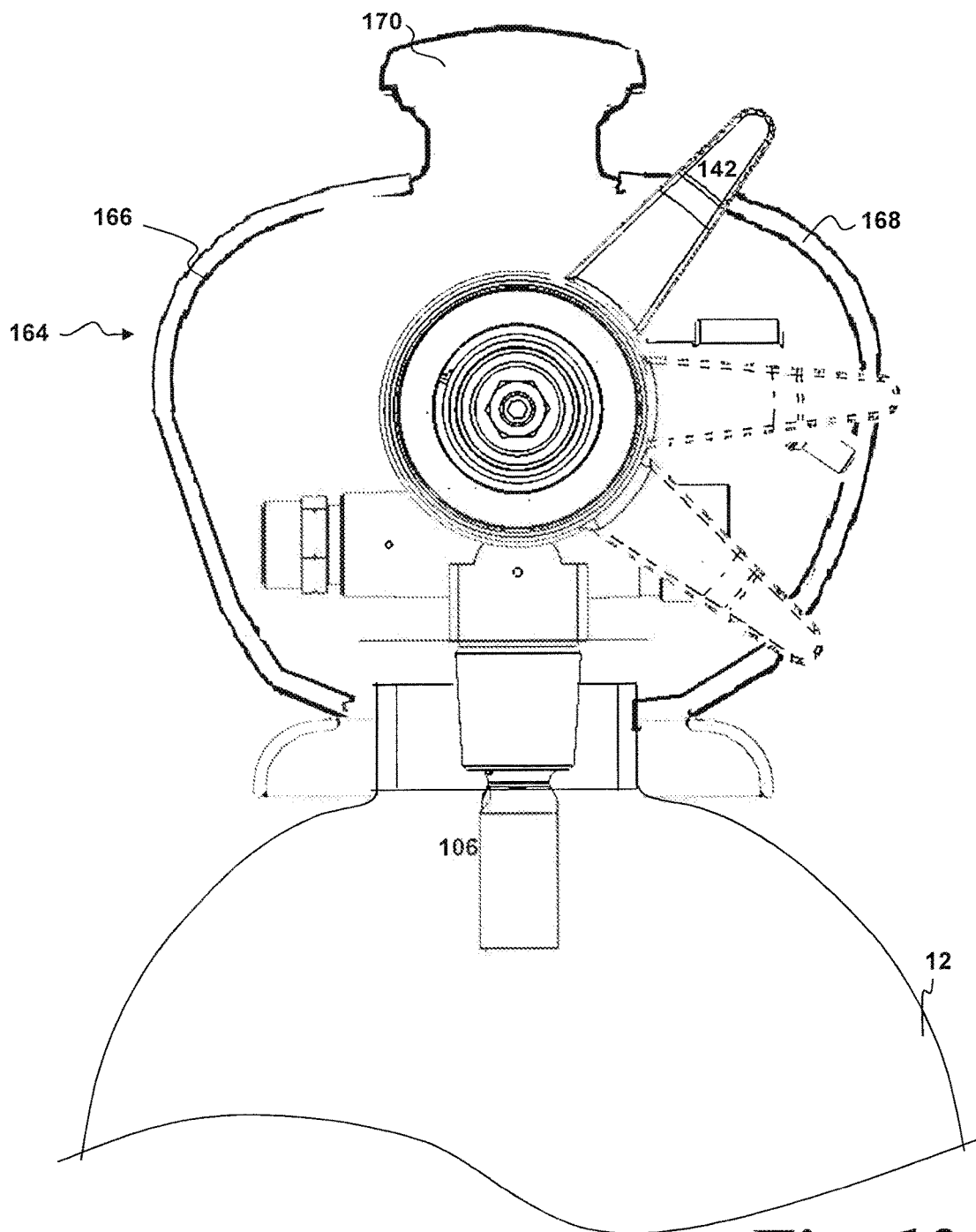
FIG. 13 is a partial cutaway of the gas cylinder and valve assembly of FIG. 10 showing a graspable control handle of the valve assembly in various operational positions.
Figure 14:
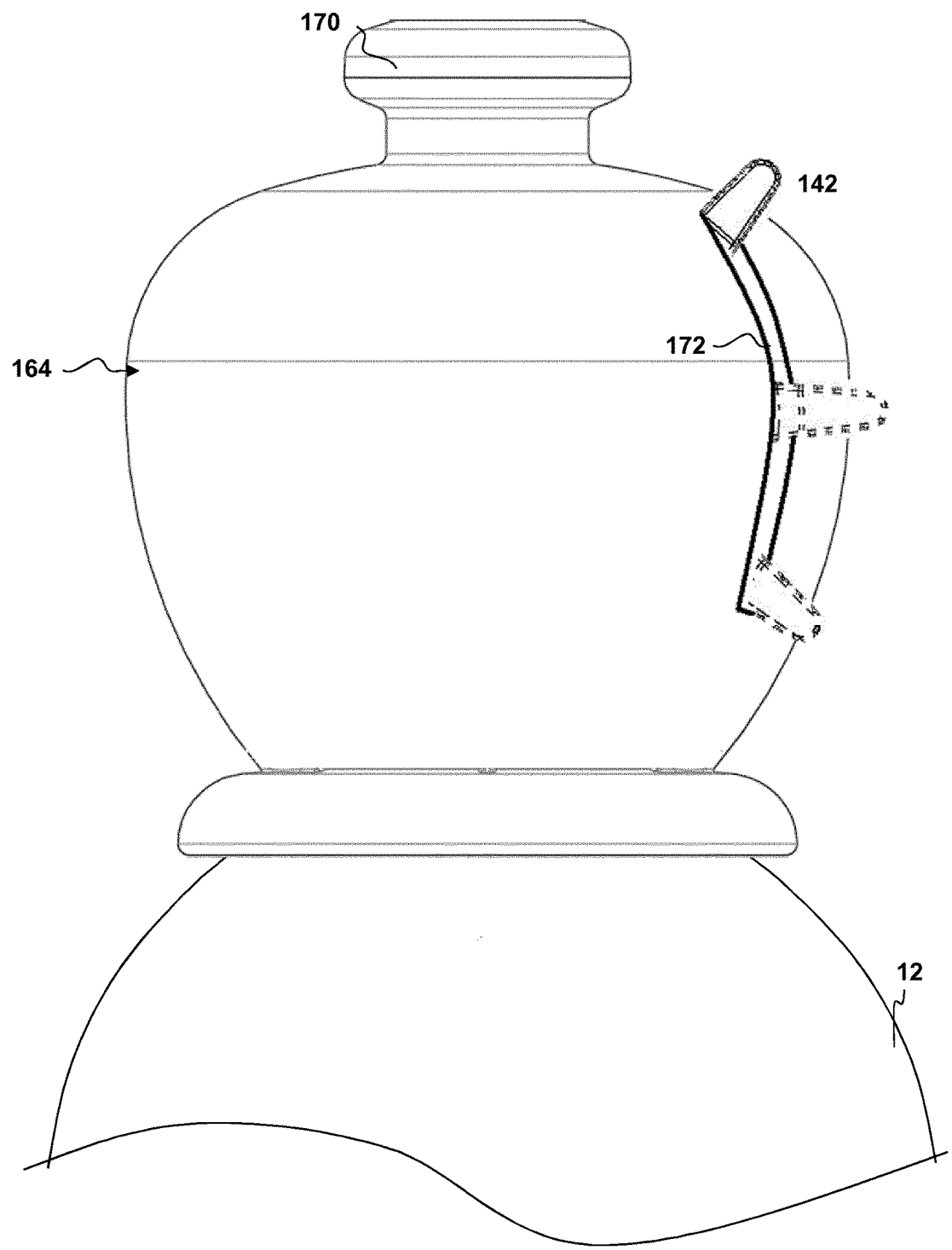
FIG. 14 is a view similar to that of FIG. 13 but showing the gas cylinder and valve assembly as it would be seen from an external observer in use.

FIG. 13 shows a composite section through a part of the valve arrangement 100 and gas cylinder 12. FIG. 14 shows a similar view showing how the valve arrangement 100 and gas cylinder 12 would appear in use to an external observer.

Referring to FIG. 13, it can be seen that the graspable arm 142 offers a clear visual indicator by which users may determine, from a cursory glance, whether the gas cylinder 12 is in use and the line attached is pressurised. Further, a clear visual indicator of the pressure setting selected is available upon brief visual inspection.

Further, the graspable handle 120 and associated arrangement provides significant advantages over known arrangements. The graspable handle 142 only has to be rotated through a relatively small angle between on and off positions when compared to known valve arrangements. The angle through which the graspable handle 120 has to be rotated between extreme positions is less than 180°, and preferably 90° or less. This is in contrast to existing arrangements where a tap or valve control has to be given many turns to close or open the respective valve.

Further, when located on an upright gas cylinder 12, the graspable handle 120 is rotatable about a substantially horizontal axis. This is easy and intuitive to operate for a user. Further, the angular movement of the graspable arm 142 between the selectable pressure settings occurs in a substantially vertical plane, aiding observation by a user.

Referring to FIGS. 13 and 14, a guard arrangement 164 is provided to shield the valve arrangement 100 in use. As shown in FIG. 13, the guard 164 is formed in three components: first and second housings 166, 168 and a rotatable cap 170. The first and second housings 166, 168 are arranged to form a clamshell structure connected by the rotatable cap 170 at an upper end and by fixing means (such as screws) at a lower end.

When assembled, the first and second housings 166, 168 and the rotatable cap 170 form the guard 164. The guard 164 is substantially elliptical and has a circular cross-section. Provision may be made within the structure of the guard 164 for one or more access ports (not shown). These access ports may include items such as a display, or provide access to the outlet 108 or the fill port 110.

The guard arrangement 164 is arranged to surround the valve arrangement 16 and protection structure 100, and provides both structural and environmental protection for the valve 16 and related components. In other words, the guard 164 forms a housing or cover for the valve 16.

Further, the guard 164 improves the aesthetic appearance of the cylinder assembly 10 and enables further items to be contained within; for example, an electronic display (arranged to fit in an aperture 120a formed in the first housing 120) or additional electronics or components required for operation of the gas cylinder assembly 10.

The rotatable cap 170 is arranged to rotate about the longitudinal axis of the gas cylinder 12 and around the upper end of the guard 164 and protection structure 100 so that the cylinder assembly 10, when in an upright position, can be rolled by a user whilst the user holds the rotatable cap 170 with one hand. The fixing means are then used at a lower end of the guard 164 to secure the first and second housings 166, 168 to one another and to the valve 16.

The first and second housings 166, 168 may be made from any suitable material. Nevertheless, injection moulded plastics material is the preferred material choice due to the ease of manufacture and the range of design freedom. Plastics materials such as ABS or polycarbonate may be used in non-limiting and non-exhaustive examples.

As shown in FIG. 14, an aperture 172 is formed in the guard 164. The aperture 172 is in the form of a channel and is designed to enable the distal end of the graspable handle 142 to protrude from within the interior of the guard 164. Therefore, the graspable handle 172 can be easily manipulated by a user whilst maintaining the structural, aesthetic and safety benefits of the guard 164. Such a configuration would only be practicable with a rotating graspable arm 142 which moves, in use, in a substantially vertical plane. This enables the position of the graspable arm 142 to be inspected visually readily and without ambiguity.

Figure 15:
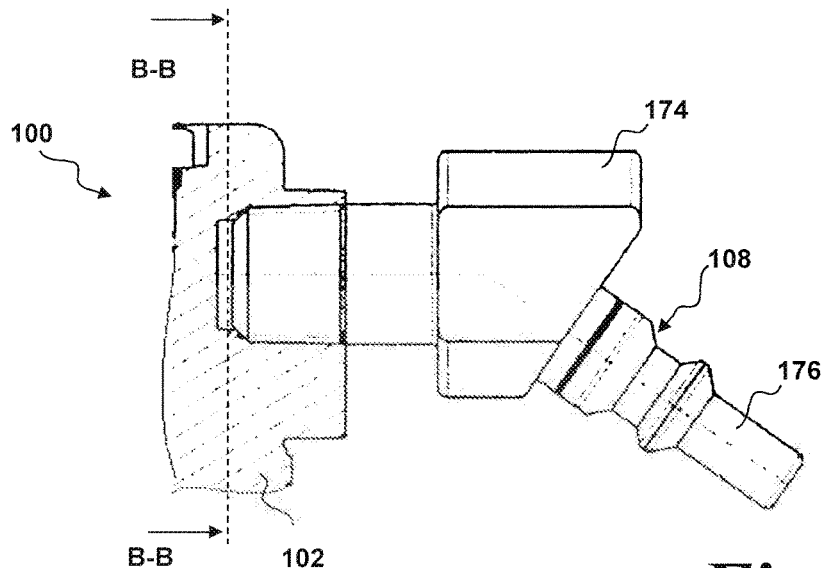
FIG. 15 is a cross-sectional view taken through a part of the valve of FIG. 3 in the direction B-B shown in FIG. 3.

FIG. 15 shows a further cross section through a part of the valve arrangement 100 taken in the direction B-B shown in FIG. 3.

FIG. 15 shows the outlet 108. The outlet 108 comprises a fixed-size flow orifice 174 and a quick connect adapter 176. The quick connect adapter 176 is adapted and arranged to enable the valve assembly 100 to be connected to other components in a gas assembly; for example, hoses, pipes, or further pressure valves or regulators.

The fixed-size flow orifice 174 is selected from a group of suitable orifices, and is easily interchangeable depending upon the desired end application, flow rate and duty cycle that is required. Each of the available flow control orifices 174 is sized to give nominal application flows when matched to the discrete pressure settings of the pressure regulator 118 as described. The flows which the various selectable orifices sizes can provide may overlap in flow range when taken with different pressure settings. However, each combination provides specific advantages when used with different flow rates and duty cycles.

In other words, each fixed-size flow control orifice 174 is arranged to provide specific discrete flow rates when used with the discrete pressure settings of the pressure regulator 118. These discrete flow rates are nominal flow rates for, for example, welding purposes. The flow ranges for at least some of the flow control orifices 174 overlap so that, in use, the same discrete flow rate can be achieved through at least two different combinations of flow control orifice 174 and discrete pressure setting.

The end user may be provided with a sizing guide, or point-of use flow measuring equipment can determine which combination of flow selector setting and orifice size is optimal for the application and minimizing weld surge.

Figure 16:
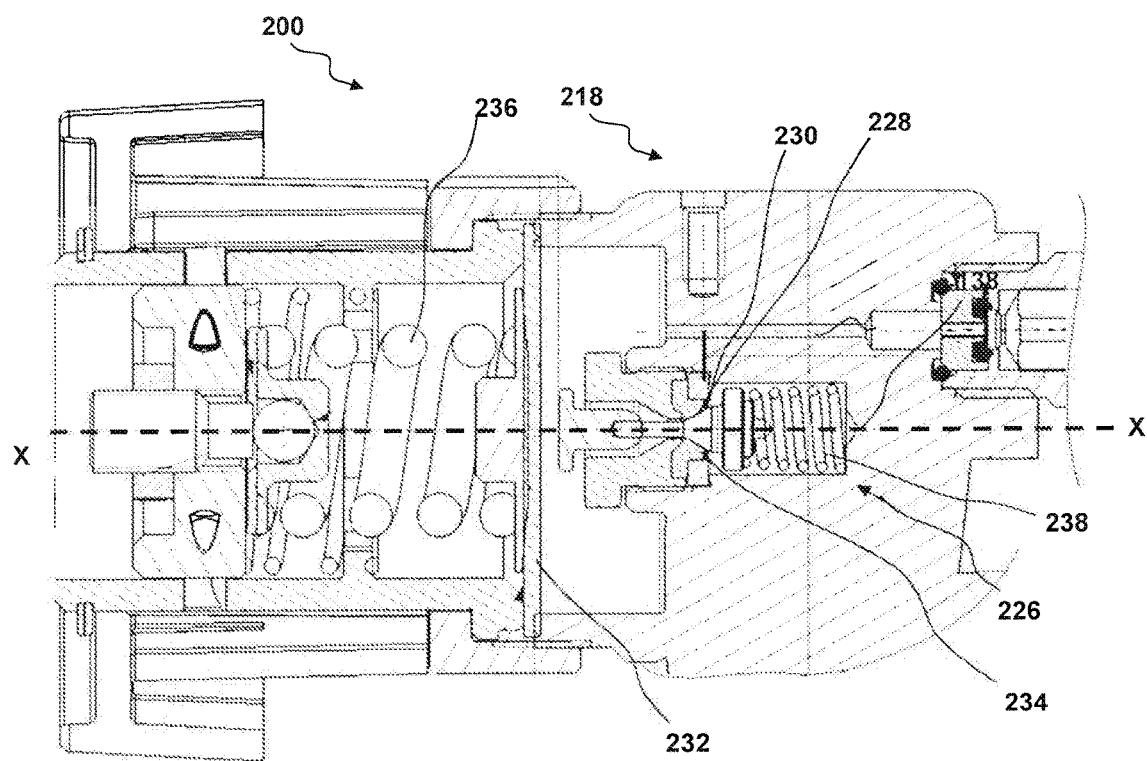
FIG. 16 is a cross-sectional view similar to FIG. 6 through a second embodiment of the valve assembly.

A second embodiment of the invention is shown in FIG. 16. The second embodiment comprises a valve arrangement 200. In the embodiment of FIG. 16, the valve arrangement 200 comprises a pressure regulator 218. The pressure regulator 218 is substantially similar to the pressure regulator 116 of the first embodiment. However, in the second embodiment, a diaphragm 232 is used in place of the piston 132 of the first embodiment.

As shown in FIG. 16, the valve region 226 comprises a poppet valve 228 located adjacent a valve seat 230. The poppet valve 228 is connected to a diaphragm 232 which is configured to enable translational movement of the poppet valve 228 along the axis X-X towards and away from the valve seat 230 to close and open respectively an aperture 234 therebetween. The diaphragm 232 is sealed at ends thereof and operable to move in response to gas pressure.

The diaphragm 232 is resiliently biased by a biasing arrangement in the form of a control spring 236 located about the axis X-X. A further opposing spring 238 is provided to act directly on the poppet valve 228 to provide a stabilising and centring force on the poppet valve 228.

The regulator 218 is operable to receive gas from the gas cylinder 12 at full cylinder pressure (e.g. 100-900 bar), but to deliver gas at a substantially constant fixed low pressure (e.g. 5 bar) to the outlet 108. This is achieved by a feedback mechanism whereby the pressure of gas downstream of the aperture 234 is operable to act on the diaphragm 232 in a chamber adjacent thereof, and in opposition to the biasing force of the spring 236. This counterbalancing effect on the diaphragm 232 provides for a particular pressure at which the system is in equilibrium. Thus, at the desired particular set pressure, the spring and gas forces are selected to be equal.

Therefore, should the pressure of gas in the region adjacent the diaphragm 232 exceed the specified level, the diaphragm 232 is operable to distort and cause movement of the poppet valve 228 along the axis X-X (towards the left hand side of FIGS. 5 and 6). As a result, the poppet valve 228 is moved closer to the valve seat 230, reducing the size of the aperture 234 and, consequently, restricting flow of gas from the inlet 106 to the outlet 108. Concomitantly, if the gas pressure reduces, the diaphragm 232 returns towards it original, undistorted shape and the poppet valve 228 is moved away from the valve seat 230, increasing the size of the aperture 234 is increased.

Figure 17:
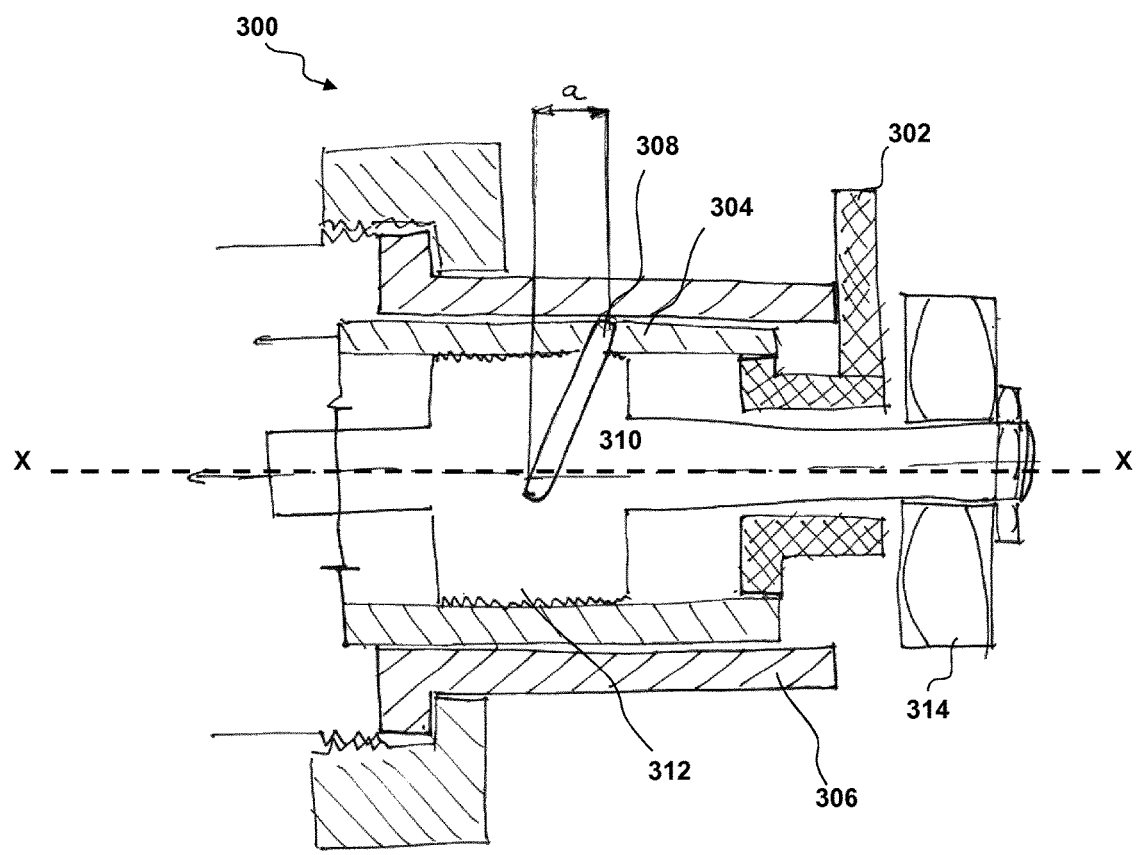
FIG. 17 is a general schematic of a third embodiment of the valve assembly.
Figure 18:
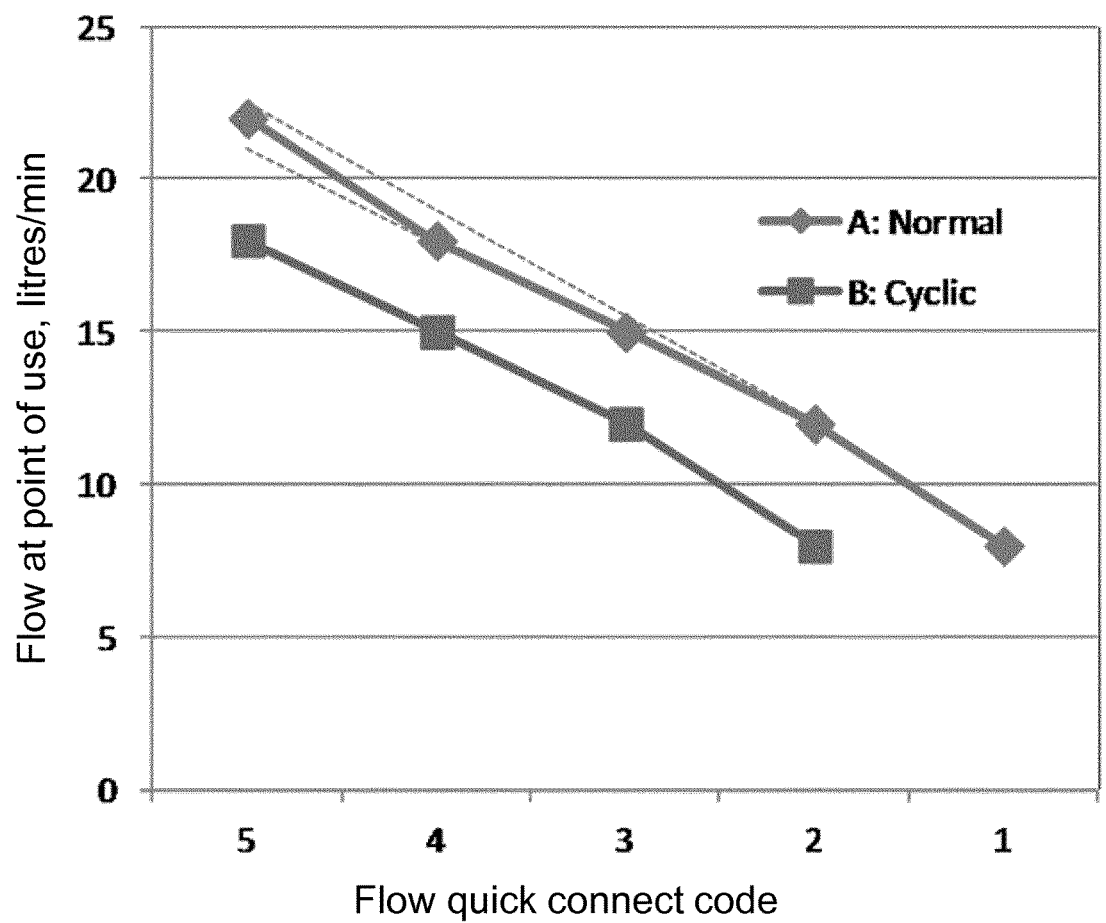
FIG. 18 is a graph illustrating the different flow rates achievable with different pressure selections and orifice sizes.

A third embodiment of the invention is shown in FIG. 17. The features of the third embodiment shown in FIG. 17 which are in common with the first and second embodiments of FIGS. 3 to 16 are allocated the same reference numerals and will not be described again here.

The third embodiment comprises a valve arrangement 300. In the embodiment of FIG. 17, the predetermined discrete selectable positions are further able to be modified by provision of a fine tuning selector. As previously described, rotational movement of the graspable handle 302 causes the central barrel 304 to move along the axis X-X relative to the cylindrical guide 306 by means of the pins 308 sliding within the channels 310.

However, the valve arrangement 300 further provides a mechanism for adjusting, via a further barrel 312, the relative positions of the channel 310 and pins 308. The barrel 312 can be adjusted my means of a further, fine adjustment handle 314. This has the effect of enabling translation along the axis X-X of the preset positions defined by the locating notches (not shown) to refine the pressure set points.

In other aspects, the valve arrangement 300 corresponds to the valve arrangement 100 or, alternatively, the valve arrangement 200 of FIG. 16.

In use, a user selects a particular pressure regulator 118 setting and flow restriction orifice 176 size to achieve a particular flow rate with particular anti-surge properties optimised for a particular application. In other words, a desired flow rate is selected and the appropriate combination of flow control orifice 174 and discrete pressure setting selected from the available combinations which can provide that discrete flow rate in dependence upon, for example, the duty cycle of the end application.

FIG. 15 shows a typical flow-range and overlap between the various available settings.

A user can select a desired flow rate and the appropriate combinations for that flow rate based on the duty cycle of the variable flow rate welding application. For normal welding, the user would select the flow rate combinations on line A. Line B indicates the pressure and orifice configurations which are optimised for weld surge minimisation. In other words, for rapid-cycling welding, line B options should be selected.

If rapid cycling welding is performed with combinations on normal line A, the set flows will be achieved but the weld surge volume may be higher.

Concomitantly, if the rapid cycling line B combination is used, it may be that the set-flow reduces below the required value over the time of the welding operation, depending on the equipment set-up downstream. The drop-off in flow may be especially acute if there are short pipes and hoses.

Therefore, selection of the options allows for tailoring of the end user requirements and surge reduction performance.

In use, an application having steady state weld time of 15 secs and requiring a nominal flow of 15 liters/min would use setting A and orifice size 3. The weld surge volume that would typically be experienced would be approximately 1 liter per operation.

The same equipment but running on a cycle time 1 second on, 1 second off (i.e. a duty cycle of 50%) and a flow of 15 liters/min could still use setting A and orifice size 3. But because of the short on-time, the proportion of time when there is excess flow is higher; in some apparatus set-up the flow may never settle to a steady state flow of 15 liters/minute. The weld surge volume that would typically be experienced 0.2 liters per operation.

Alternatively, the setting selected is setting B and orifice size 4. The different B setting lowers the peak pressure that can be experienced in static conditions, minimizes the possible surge volume, yet still providing the required nominal flow at point-of-use. A reduced excess volume is 0.1 liters. Therefore, using setting B reduces the weld surge volume by 50%.

By way of further example, Table 1 below shows some example measured flow rates for the embodiment described above with two discrete positions. Various quick connect flow restriction orifices 176 are used, characterised by the flow rate (in liters per minute (LPM)) that they are able to support.

TABLE 1

| Quick Connector (LPM) | Position 1 | Position 2 |
|---|---|---|
| 5 | 2.5 | 5.2 |
| 8 | 3.5 | 6.9 |
| 12 | 6 | 12.1 |
| 15 | 7.5 | 14.6 |
| 18 | 9 | 17.5 |

Whilst the above embodiments have been described with reference to two operational and one closed preset positions, the skilled person would be readily aware of alternatives that would fall within the scope of the present application. For example, any suitable number of discrete selectable positions may be used with the present invention.

Further, whilst the present invention has been described with reference to controlling the compression length of a single control compression spring (spring 136 in the first embodiment), the present invention may comprise more than one compression control spring. For example, when selecting a preset pressure, the present invention may be operable to select different springs, or a unique combination of springs, for each discrete pressure setting.

Additionally, the rotating handle arrangement of the present invention provides further benefits. For example, the movement of the handle in a substantially vertical plane enables the handle to comprise a locking means for engaging with, for example, the guard 164 to enable the pressure regulator 118 to be locked in predetermined position.

Whilst the pressure regulator of the above embodiments has been described as relating to either a piston regulator or a diaphragm regulator, other arrangements could be contemplated by the skilled person and would fall within the scope of the present invention. For example, in place of a diaphragm or piston, the pressure regulator may comprise a dome loaded with a fixed sealed reference pressure, with the rotating arm changing the volume of the sealed reference and hence the pressure.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

Similar situations may well apply equally to other gas applications supplied by high pressure gas cylinders, such as in food MAP, beverage dispense systems.

The invention claimed is:

1. A pressure regulator for regulating the flow rate of a gas source, the pressure regulator comprising:
a housing having:
an inlet in communication with the gas source,
an outlet operable to supply a gas at a given pressure and flow rate,
a conduit extending between the inlet and the outlet,
a restriction device located in the conduit and to control the flow of gas therethrough,
a biasing arrangement to apply a predetermined bias to the restriction device,
a selection device operable to select one of a predetermined plurality of discrete configurations of the restriction device, each configuration providing a discrete pressure setting for gas pressure at the outlet, and
a fixed-size orifice in the outlet selected from a specific group of interchangeable fixed-size orifices each sized to provide a flow rate range defined by a nominal flow rate,
such that the combination of restriction device configurations and fixed-size orifices provides a group of discrete flow rate range/pressure combinations to variable flow rate applications downstream of said outlet,
wherein the flow rate ranges of at least some of the orifices overlap such that a particular discrete flow rate can be obtained from at least two different combinations of fixed-size orifice and discrete restriction device configuration.

2. A pressure regulator according to claim 1, wherein the number of selectable discrete positions is five or fewer.

3. A pressure regulator according to claim 2, wherein the number of selectable discrete positions is three or fewer.

4. A pressure regulator according to claim 1, wherein the selection device comprises a rotary control member operable to select one of said discrete configurations, said selection device being operable to latch in each of said discrete configurations.

5. A pressure regulator according to claim 4, wherein said rotary control member is operable to move a control device to one of a predetermined number of linearly-offset positions, the bias from said biasing arrangement being dependent upon the linearly-offset position of the control device.

6. A pressure regulator according to claim 5, wherein the biasing arrangement comprises at least one control compression spring and the bias of the control compression spring is dependent upon the linear offset of said control device.

7. A pressure regulator according to claim 5, wherein said control device comprises at least one pin operable to slide within at least one corresponding channel, said pin and channel controlling the linear movement of said control device.

8. A pressure regulator according to claim 7, wherein the or each channel comprises a plurality of locating notches for receiving the or each corresponding pin, each locating notch defining a discrete configuration of said selection device.

9. A pressure regulator according to claim 8, wherein the selection device comprises a resilient element to bias the or each pin into a respective locating notch.

10. A pressure regulator according to claim 1, wherein the selection device further comprises a graspable rotatable handle.

11. A pressure regulator according to claim 10, wherein said graspable rotatable handle is rotatable through an angular range of less than 180° to select any of said discrete positions.

12. A pressure regulator according to claim 1, wherein the restriction device comprises a linearly-movable valve connected to a diaphragm or a piston.

13. A valve assembly including the pressure regulator of claim 1.

14. A gas cylinder assembly including a gas cylinder body and the valve assembly of claim 13.

* * * * *